United States Patent
Maiorano et al.

(10) Patent No.: US 11,531,547 B2
(45) Date of Patent: Dec. 20, 2022

(54) DATA PROCESSING

(71) Applicant: Arm Limited, Cambridge (GB)

(72) Inventors: Damian Maiorano, Juan-les-Pins (FR);
Luca Nassi, Antibes (FR); Cédric Denis Robert Airaud, Saint Laurent du Var (FR); Christophe Laurent Carbonne, Mouans-Sartoux (FR); Jocelyn François Orion Jaubert, Antibes (FR); Pasquale Ranone, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/326,864

(22) Filed: May 21, 2021

(65) Prior Publication Data
US 2022/0374240 A1 Nov. 24, 2022

(51) Int. Cl.
*G06F 9/38* (2018.01)
*G06F 9/30* (2018.01)
*G06F 11/07* (2006.01)

(52) U.S. Cl.
CPC ........ *G06F 9/3836* (2013.01); *G06F 9/30036* (2013.01); *G06F 9/30101* (2013.01); *G06F 9/30145* (2013.01); *G06F 11/0772* (2013.01)

(58) Field of Classification Search
None
See application file for complete search history.

(56) References Cited

U.S. PATENT DOCUMENTS

| | | | | |
|---|---|---|---|---|
| 2008/0263331 | A1* | 10/2008 | Le | G06F 9/3861 712/217 |
| 2014/0237303 | A1* | 8/2014 | Bharadwaj | G06F 11/0751 714/48 |
| 2016/0335088 | A1* | 11/2016 | Scalabrino | G06F 9/3857 |

OTHER PUBLICATIONS

Nigel Stephens, et al., "The ARM Scalable Vector Extension", IEEE Micro, vol. 37, Issue 2, Mar.-Apr. 2017, 8 pages.

* cited by examiner

*Primary Examiner* — John M Lindlof
(74) *Attorney, Agent, or Firm* — Nixon & Vanderhye P.C.

(57) ABSTRACT

Data processing circuitry comprises out-of-order instruction execution circuitry; register mapping circuitry to map zero or more architectural processor registers relating to execution of that program instruction to respective ones of a set of physical processor registers; commit circuitry to commit, in a program code order, the results of executed program instructions, the commit circuitry being configured to access a data store which stores register tag data to indicate which physical registers mapped by the register mapping circuitry relate to a given program instruction; fault detection circuitry to detect a memory access fault in respect of a vector memory access operation and to generate fault indication data indicative of an element earliest in the element order for which a memory access fault was detected; a fault indication register to store the fault indication data, in which the register mapping circuitry is configured to generate a register mapping for a program instruction for any architectural processor registers relating to execution of that program instruction other than the fault indication register; and control circuitry to encode the fault indication data, applicable to a program instruction not yet committed by the commit circuitry, to register tag data associated with that program instruction.

13 Claims, 6 Drawing Sheets

| Instr ID | reserved PTAG | Other PTAG(s) | Valid |
|---|---|---|---|
| | | | |
| | | | |
| | | | |
| | | | |
| | | | |
| | | | |
| | | | |
| | | | |

Program order

| P1  | T    | T     | T    | T    |
|-----|------|-------|------|------|
| Z3  | A(3) | (Bad) | A(1) | A(0) |
| FFR | T    | T     | T    | T    |

Fig. 2

| FFR | F | F | T | T |
|-----|---|---|---|---|

Fig. 3

| P1 | T    | T     | F    | F    |
|----|------|-------|------|------|
| Z3 | A(3) | (Bad) | A(1) | A(0) |

Fig. 4

SetFFR:

| FFR | T | T | T | T |
|-----|---|---|---|---|

Fig. 5

ReadFFR:

| FFR |  |  |  |  |
|-----|--|--|--|--|

⇩

| Pn |  |  |  |  |
|----|--|--|--|--|

Fig. 6

| Instr ID | PTAG(s) | Valid |
|---|---|---|
|  |  |  |
|  |  |  |
|  |  |  |
|  |  |  |
|  |  |  |
|  |  |  |
|  |  |  |

| Instr ID | reserved PTAG | Other PTAG(s) | Valid |
|---|---|---|---|
|  |  |  |  |
|  |  |  |  |
|  |  |  |  |
|  |  |  |  |
|  |  |  |  |
|  |  |  |  |
|  |  |  |  |

DATA PROCESSING

BACKGROUND

This disclosure relates to data processing.

Some data processing circuitry operates with respect to so-called data vectors comprising a plurality of data elements having a data element order.

In some examples fault detection circuitry can be used (for example during a so-called "gather" or "scatter" memory access operation) to detect a memory access fault in respect of such a vector memory access operation and to generate fault indication data indicative of an element earliest in the element order for which a memory access fault was detected. The results of such a fault detection operation can be stored in a fault indication register.

Also, some data processing arrangements make use of so-called out-of-order instruction execution to execute program instructions in an instruction execution order which may differ from a program code order.

SUMMARY

In an example arrangement there is provided a data processing circuitry comprising: out-of-order instruction execution circuitry to execute program instructions, the program instructions having a program code order, the out-of-order instruction execution circuitry being configured to execute the program instructions in an instruction execution order which may differ from the program code order, the program instructions including vector processing instructions to perform vector processing operations to data vectors each comprising a plurality of elements having an element order; the out-of-order instruction execution circuitry being configured to execute program instructions defining a vector memory access operation in respect of the plurality of elements;

register mapping circuitry to generate a register mapping for a program instruction to map zero or more architectural processor registers relating to execution of that program instruction to respective ones of a set of physical processor registers;

commit circuitry to commit, in the program code order, the results of program instructions executed by the out-of-order instruction execution circuitry, the commit circuitry being configured to access a data store which stores register tag data to indicate which physical registers mapped by the register mapping circuitry relate to a given program instruction;

fault detection circuitry to detect a memory access fault in respect of a vector memory access operation and to generate fault indication data indicative of an element earliest in the element order for which a memory access fault was detected;

a fault indication register to store the fault indication data, in which the register mapping circuitry is configured to generate a register mapping for a program instruction for any architectural processor registers relating to execution of that program instruction other than the fault indication register; and control circuitry to encode the fault indication data, applicable to a program instruction not yet committed by the commit circuitry, to register tag data associated with that program instruction.

In another example arrangement there is provided a method comprising:

executing program instructions having a program code order, in an instruction execution order which may differ from the program code order, the program instructions including vector processing instructions to perform vector processing operations to data vectors each comprising a plurality of elements having an element order; the executing step comprising executing program instructions defining a vector memory access operation in respect of the plurality of elements;

generating a register mapping for a program instruction to map zero or more architectural processor registers relating to execution of that program instruction to respective ones of a set of physical processor registers;

committing, in the program code order, the results of program instructions executed by the executing step, the committing step comprising accessing a data store which stores register tag data to indicate which mapped physical registers relate to a given program instruction;

detecting a memory access fault in respect of a vector memory access operation;

generating fault indication data indicative of an element earliest in the element order for which a memory access fault was detected;

storing the fault indication data in a fault indication register, in which the generating step is configured to generate a register mapping for a program instruction for any architectural processor registers relating to execution of that program instruction other than the fault indication register; and encoding the fault indication data, applicable to a program instruction not yet committed by the committing step, to register tag data associated with that program instruction.

In another example arrangement there is provided a non-transitory computer-readable medium to store computer-readable code for fabrication of a data processing circuitry comprising:

out-of-order instruction execution circuitry to execute program instructions, the program instructions having a program code order, the out-of-order instruction execution circuitry being configured to execute the program instructions in an instruction execution order which may differ from the program code order, the program instructions including vector processing instructions to perform vector processing operations to data vectors each comprising a plurality of elements having an element order; the out-of-order instruction execution circuitry being configured to execute program instructions defining a vector memory access operation in respect of the plurality of elements;

register mapping circuitry to generate a register mapping for a program instruction to map zero or more architectural processor registers relating to execution of that program instruction to respective ones of a set of physical processor registers;

commit circuitry to commit, in the program code order, the results of program instructions executed by the out-of-order instruction execution circuitry, the commit circuitry being configured to access a data store which stores register tag data to indicate which physical registers mapped by the register mapping circuitry relate to a given program instruction;

fault detection circuitry to detect a memory access fault in respect of a vector memory access operation and to generate fault indication data indicative of an element earliest in the element order for which a memory access fault was detected;

a fault indication register to store the fault indication data, in which the register mapping circuitry is configured to generate a register mapping for a program instruction for any architectural processor registers relating to execution of that program instruction other than the fault indication register; and control circuitry to encode the fault indication data, applicable to a program instruction not yet committed by the commit circuitry, to register tag data associated with that program instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 2 to 4 schematically illustrate respective stages in execution of an example vector instruction;

FIGS. 5 and 6 schematically illustrate operations with respect to a first fault register;

DESCRIPTION OF EMBODIMENTS

Example Processor

Figure 1:
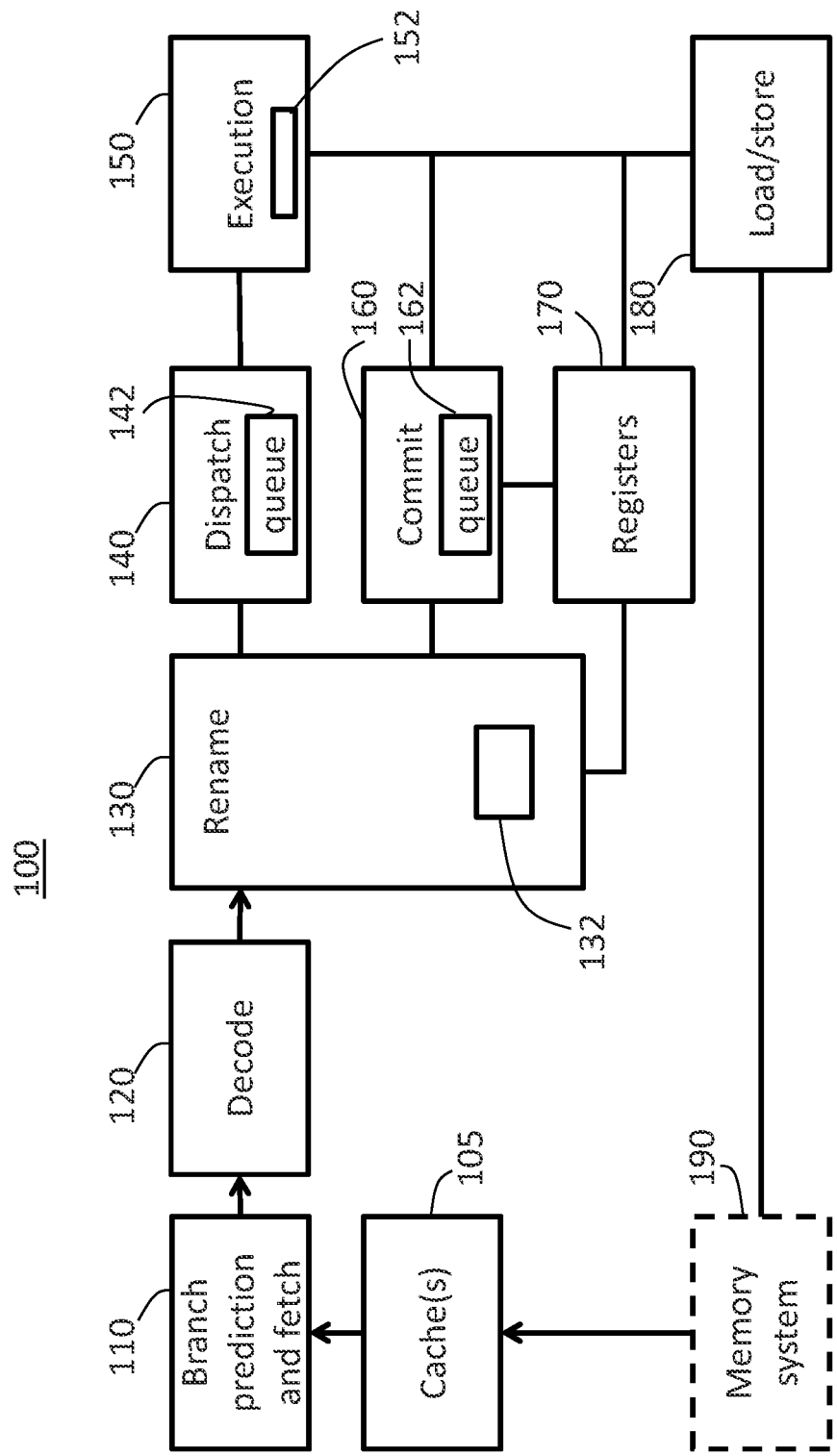
FIG. 1 schematically illustrates data processing circuitry.

FIG. 1 schematically illustrates an example processor or data processing circuitry 100. The example shown in FIG. 1 is a so-called out-of-order (OoO) processor in which program instructions (which may include vector processing instructions) having a program code order are executed in an instruction execution order which may differ from the program code order. Features which enable this mode of operation will be discussed below.

Instructions for execution retrieved from a memory system 190, drawn in broken line because it may be external to the data processing circuitry 100, via one or more cache memories 105, under the control of the branch prediction and fetch circuitry 110 which operates to fetch instructions which are predicted to be required next for execution. Where the instruction flow is linear, the prediction would be that a next program instruction in the program code order is required next for execution. Where a branch instruction is encountered, the branch prediction and fetch circuitry 110 can operates to predict the outcome of such a branch and, where necessary, vary the order in which instructions fetched in response to that predicted outcome.

The fetched instructions are decoded by a decoded stage 120 and then passed to a rename stage 130 which forms part of the functionality used to allow for OoO operation.

Program instructions for execution may refer to zero or more architectural program registers. These are processor registers which are uniquely specified by the instruction set architecture. For execution, these architectural program registers are associated with physical program registers 170 (of which there may be a different, for example greater, number than the number of architectural program registers by a mapping generated by the rename stage 130. In general terms, the architectural registers are mapped to tags, with each tag value referring to a respective physical register. The tags are referenced in a dispatch queue 142 maintained by dispatch circuitry 140 and in a commit queue 162 maintained by commit circuitry 160. An instruction is not dispatched until the mapped physical registers mapped for use by that instruction are available (and any required operand values have been generated).

Instructions are committed by the commit circuitry 160 in the program code order. Once an instruction has been committed, the physical registers referenced by the mapping associated with that instruction are made available for use by subsequently executed instructions.

Instructions dispatched by the dispatch circuitry 140 are provided to execution circuitry 150 which can read information from or write information to the physical registers 170 and can also access data stored by the memory system 190 using load/store circuitry 180. One or more stages of memory address translation (not shown) may be provided between the execution circuitry 150 and the memory system 190.

The execution circuitry includes fault detection circuitry 152 to derive first fault information (to be described below).

Memory Accesses

Some vector processing program instructions can define memory accesses. In some examples, each data element of a data vector may define or be associated with a respective (and potentially non-contiguous) address for a memory access. In some examples, this type of memory access is referred to as a "gather" (in the case of read operations) or "scatter" (in the case of write operations) memory access.

In general terms, the program instructions defining a vector memory access operation in respect of the plurality of elements define a set of memory access operations, one for each of the plurality of elements, at least some of the memory access operations for contiguous elements in the element order being accesses to non-contiguous memory locations.

Predicated Processing Operations

So-called predicated processing operations will now be described. This term is typically applicable to vector processing operations performed by the execution unit 150 and concerns operations which propagate a set of zero or more portions or elements of the prevailing contents of a destination architectural register as respective portions of the output multi-bit data item, the set of portions being defined by so-called predicate data.

Examples of types of operation using predicate merge techniques may be found in the instruction set of processors using the so-called "Scalable Vector Extension" (SVE) or SVE2 architectures provided by Arm Ltd and described in Stephens et al: "The ARM Scalable Vector Extension", IEEE Micro vol 37. issue 2, March-April 2017, the entire contents of which are incorporated in this description by reference. A specific example is as follows:

ADD Z0.D,P0/M,Z1.D,Z2.D

This is an example of an addition operation which adds the active elements of architectural registers Z1 and Z2 holding source operands, putting the results into a destination register Z0. P0 is a predicate register which indicates those elements of the operands which are "active" and "inactive". [The suffix "M" after P0 indicates a particular example of a predicated merge operation in which any inactive elements will be merged. That is to say, any inactive elements of Z0 will remain at their original or prevailing values before execution of the operation. However, the term "predicated operations" may instead refer to zeroing operations, that is, operations in which inactive elements are forced to 0].

Note that the predicate register may define any number or set of zero or more elements to be active. It is possible for a predicate register to define that all elements are active or alternatively to define that all elements are inactive. Any permutation of active elements between these extremes is also possible.

Note also that the add operation shown above is simply one of many possible examples of predicated operations.

Vectorised Loop Operations and First Fault Detection

It is possible using vector processing circuitry to implement operations which could otherwise be treated as scalar loops, by performing multiple operations (in respect of data elements of a data vector) at a single loop iteration. A further example of this technique may be referred to as "unrolling" a loop and involves processing multiple successive data vectors within a single loop iteration. Loop unrolling is carried out, for example, in order to improve efficiency, in that the processing overheads involved in initiating and terminating each iteration of the loop are then shared between the processing of multiple data vectors.

However, to allow for loops to be vectorised when they have data-dependent conditions for terminating the loop, because each iteration of the loop encompasses multiple operations (which may ultimately fall inside or outside of the terminated loop) it is necessary that some of these operations are performed speculatively before the loop termination condition can be fully resolved. In some examples such as simple integer arithmetic operations, speculative execution of this nature is considered not to pose significant risks to correct operation. However, if an instruction accesses a memory address which could potentially be invalid, measures can be taken to avoid the risks associated with speculatively executing such an instruction.

In the present example, a so-called first fault detection can be used, which suppresses memory faults (which is to say, inhibits those faults from causing an exception or error condition) unless they result from the first "active" element in the current vector (as defined by a relevant predicate). Instead, the mechanism provides an update to a so-called first fault register (FFR) to indicate which elements were not successfully loaded (or otherwise accessed) following a memory fault.

FFR Example

An example of the use of first fault detection will now be described with reference to FIGS. 2-4. Here, with reference to respective rows as drawn, "P1" refers to an arbitrary predicate register controlling the current operation, "Z3" refers to an arbitrary architectural register and "FFR" refers to the first fault register. A vector length of 4 elements, referenced as ordered elements 0-3 from right to left as illustrated, is used in this example, but it will be appreciated that the techniques are applicable to various different vector lengths. In general, the FFR may be at least as long as the vector length, so that each data vector has a data vector length and in which the fault indication register has a size equal to or greater than the vector length.

FIG. 2 schematically illustrates an example of a gather load operation which speculatively loads data from addresses A[n] held by the register Z3 under the control of the predicate register P1 which at this stage has all of its elements sets to active. FFR is initialised to all "true".

The memory accesses are dependent upon memory address translations as discussed above and fail if a memory address translation is not available, although it is noted that memory accesses may also fail for permission faults or other faults not associated with memory address translation itself. So, although some examples may use memory address translation, this is not a requirement of the present disclosure.

In FIG. 2, the memory accesses for the addresses A[0] and A[1] succeed, but that for A[2] fails, for example because a translation for A[2] is unavailable or invalid or because appropriate access permission is not granted for this memory access. However, because the memory access for the address A[0], being earlier in the vector element order 0-3, has succeeded, the fault in respect of A[2] is not trapped so as to generate an exception. Instead, the FFR positions corresponding to elements 2 and 3 are set to false. This outcome is shown schematically in FIG. 3.

This illustrates a particular feature of the FFR, which is that bits preceding the first detected fault (in the data element order) are unchanged and all bits including and following the first detected fault are set to false in response to detection of a fault. Of course, in the absence of fault detection, all bits remain unchanged. In other words, the FFR makes use of an example of unary coding in that an n-bit (or n-element) FFR has only n possible different configurations (rather than the $2^n$ possible different configurations if conventional binary coding were used). In some example arrangements, processor operations may be provided to write a given value to the FFR but in the case of processors following the SVE or SVE2 systems mentioned above, if the attempted written value does not comply with this form of unary coding, it is converted to a unary coded value by setting all bits or elements after the first "false" bit or element to false.

In some example arrangements, a next loop iteration can be used to retry the faulty memory access. For example, the contents of the FFR may be read (either routinely or in response to an indication that the FFR contents have changed) and used to populate the predicate register controlling the memory access operation (P1 in this example), so as to exclude (render inactive) elements which had a successful memory access in the previous iteration in order that the first active element for this iteration represents the first fault detected element #2.

It has been proposed that this type arrangement can allow fault-tolerant speculative vectorisation of loops with data-dependent loop termination.

Example arrangements to be discussed below refer to techniques for storing or otherwise handling the FFR in the context of an OoO processor. Note that in the absence of such techniques, either loops could not be parallelised, or renaming to an extra physical register would be required for the FFR.

FIG. 5 schematically illustrates an operation to set the FFR to "all true" using a SetFFR instruction. Note that an alternative "WriteFFR" instruction allows setting the FFR to an arbitrary value which will be handled as discussed above.

FIG. 6 schematically illustrates an operation to read the contents of the FFR using a ReadFFR instruction. It should be noted that the FFR is not directly capable of manipulation but using the ReadFFR instruction the contents of the FFR can be read to corresponding elements of another register such as a predicate register Pn.

The rename stage 130 maintains a prevailing speculative FFR state. This may differ from the actual FFR state applicable to the latest committed instruction.

Commit Queue

Figure 7A:
FIGS. 7a and 7b schematically illustrate examples of a commit queue.
Figure 7B:

FIGS. 7a and 7b schematically illustrate aspects of the commit queue 162 maintained by the commit circuitry 160. Individual commit queue entries are drawn as respective rows of FIGS. 7a and 7b.

Instructions, or at least data which defines individual instructions, can be added to the commit queue when the instructions are dispatched (or alternatively when the instructions are added to the dispatch queue 142). Renaming information is stored by the commit queue 162 in the form of PTAGs, or physical tags, identifying any physical registers which have been mapped from architectural registers by the renaming process for use by that particular instruction. A valid flag indicating the validity of a commit queue entry may be set to "invalid" when an instruction has been committed and retired. In the examples of FIGS. 7a and 7b, the commit queue entries are maintained in a program order, and that same order is used when instructions are committed, which is to say that a given instruction is not committed unless and until earlier instructions in the program code order have been committed. If any situation prevents an earlier instruction from being committed, then the pipeline and the commit queue are flushed and execution re-initiated from that point onwards. Note that it is not essential that the queue itself is maintained in program order but that some indication (whether implicit as in the examples here or explicit using a counter or ordering field in the queue) is provided to indicate the program code order.

FIG. 7b indicates a variation of the arrangement of FIG. 7a which is applicable to example embodiments of the present disclosure. Here, two features are noted: (i) the rename stage does not perform a mapping operation with respect to the FFR (as it does to all other architectural registers referenced by a given program instruction); and (ii) one PTAG entry for each instruction in the commit queue is reserved for storage of an encoded representation of the FFR. PTAGs relating to mapped registers are stored in the "other PTAG(s)" field(s) of the commit queue entry. Note that at a physical level, the "reserved PTAG" and "other PTAG(s)" fields may be identical; the titles or designations given to them here but simply to illustrate, for the sake of the schematic representation of FIG. 7b, the purpose to which they are put by the circuitry.

FFR Encoding and Decoding Example

Figure 8:
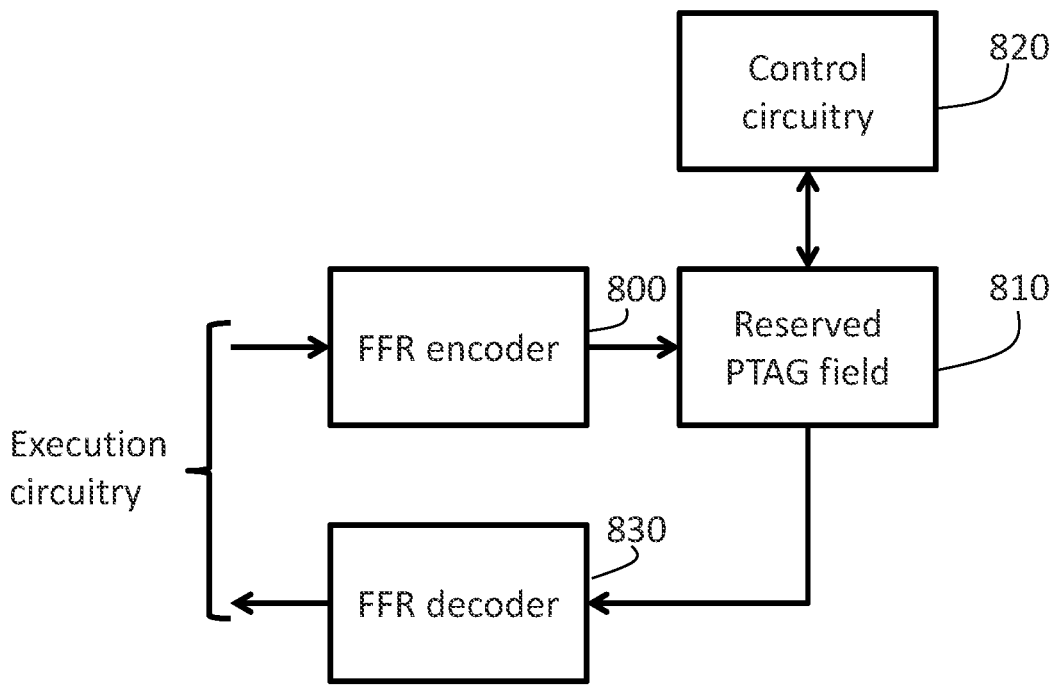
FIG. 8 schematically illustrates a part of commit circuitry.

FIG. 8 schematically illustrates a part of the operation of the commit circuitry 160. An FFR encoder 800 receives information from the execution circuitry 150 indicative of the outcome of a first fault detection and encodes this for storage by the reserved PTAG field 810 of the commit queue, applicable to that particular instruction. If and when the FFR has to be recovered, for example for writing to a predicate register using a ReadFFR instruction, an FFR decoder 830 operates to decode the value stored by the reserved PTAG field 810 and return it to the execution circuitry 150. These operations are under the control of control circuitry 820.

The encoding of the FFR information may be as follows, noting that the FFR stores a unary coded value having n different possible configurations for an n-bit or n-element FFR. These n possible configurations may be encoded by a PTAG field of $\log_2(n)$ bits. This provides an efficiency improvement, in that the register tag data has a size which is smaller than the size of the fault indication physical register. In general, the register tag data has a size which is greater than or equal to the base-two logarithm of the size of the fault indication physical register.

(a) Let m=index (0 to (n−1)) of the first false FFR bit or element in the element order;
(b) Store m as a binary encoded PTAG value.
So, for example, the FFR of FIG. 3 would have:
n=4;
number of PTAG bits requires to store the encoded information=$\log_2(4)$=2 bits;
m=2;
stored binary encoded value=10.

Exception Handling

Figure 9:
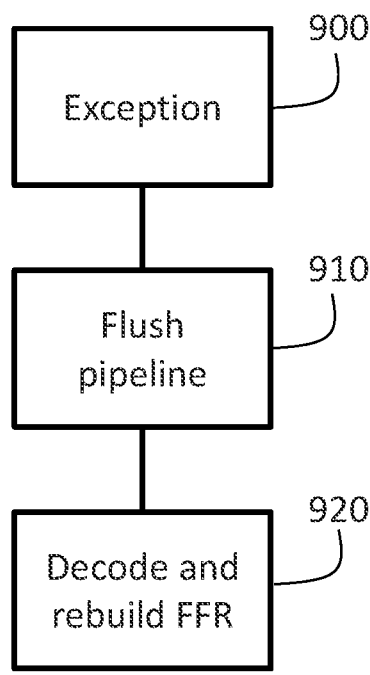
FIGS. 9 to 13 are schematic flowcharts illustrating respective methods.

One example situation in which the FFR is recovered from the encoded version is at exception handling, with an example operation being shown by the schematic flowchart of FIG. 9. At a step 900, an exception is encountered; at a step 910, the execution pipeline is flushed and at a step 920 the FFR decoder 830 decodes the FFR associated with the latest committed instruction and provides it to the execution circuitry 150.

In this example, the control circuitry 820, 830 is configured to decode the fault indication data applicable to a newly committed program instruction when execution of the newly committed program instruction caused a program exception.

Instructions to Access the FFR

Figure 10:
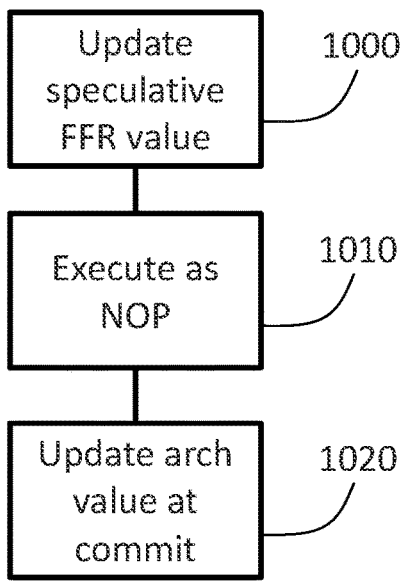
Figure 11:
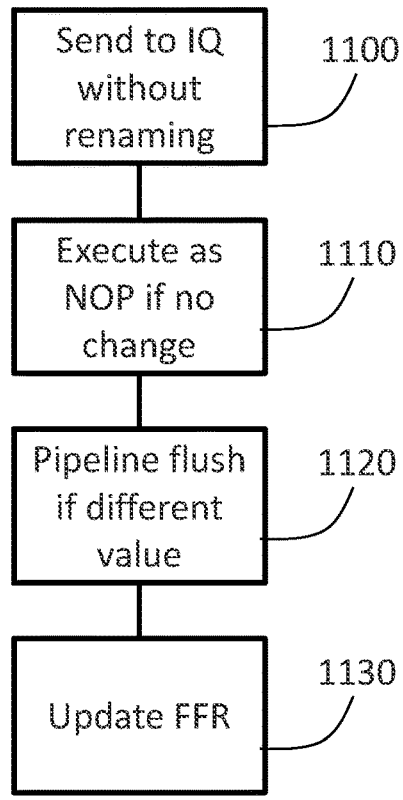
Figure 12:
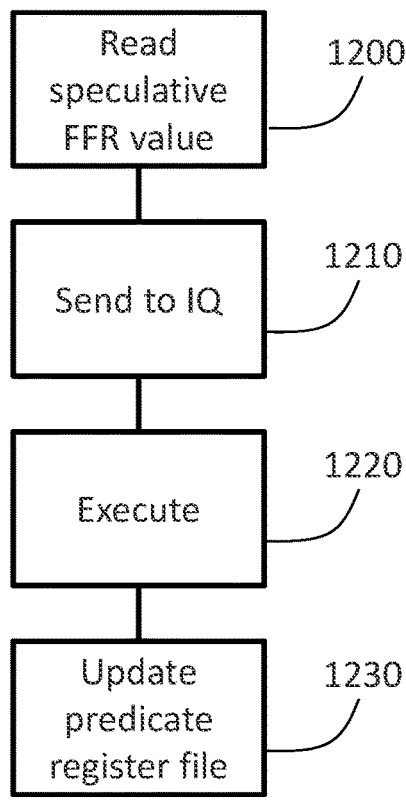

FIGS. 10-12 schematically illustrate operations associated with the SetFFR, ReadFFR and WriteFFR/Load FF respectively. In example embodiments, these are the only instructions which access the FFR.

(i) SetFFR

This instruction set orbits of the FFR to a true value. In the present examples, referring to FIG. 10, at a step 1000 the SetFFR instruction updates the speculative FFR value directly with respect to the rename process, writing the FFR value in the speculative renaming table and pushing it to the commit queue. At a step 1010, the SetFFR is executed as a NOP (no operation) and therefore is not dispatched. SetFFR therefore does not serialise which allows dependent instructions to be executed. At a step 1020, SetFFR updates the architectural value at commit time.

(ii) WriteFFR (WRFFR) and LoadFF (LDFF)

Here, WriteFFR writes a new value (or at least a value defined by that program instruction) to FFR, noting that this may be an arbitrary new value rather than the "all true" of SetFFR. LDFF reads a value from memory such that inactive elements will not cause a fault. It sets to false the FFR position starting from the first faulty address, while successful positions remain set to true. Similar considerations apply to these two instructions so that a single flowchart is provided as FIG. 11.

In general terms, WRFFR and LDFF are handled and executed as follows.

Execution is done speculatively, in the sense that WRFFR computes and write speculatively the FFR value, but if needed, it updates it at commit time flushing the pipeline such that the speculative FFR value is flushed. LDFF accesses memory speculatively, but if an FFR fault is detected, FFR is updated at commit time flushing the pipeline such that the speculative FFR value is flushed.

In these examples, when these operations change the previous FFR value (for WRFFR) or write a value different to "all true" (for LDFF, when a fault occurs during a load performed by the LDFF operation), an exception occurs and as discussed with reference to FIG. 9 commit performs a flush pipeline, flushing those instructions which could have consumed an incorrect FFR value.

Referring to FIG. 11, a WRFFR instruction is not renamed and is sent to the issue queues at a step 1100. At a step 1110 the WRFFR instruction is executed as a NOP in the commit queue if the FFR value to be written is equal to the architectural FFR value. However, if the FFR value to be written is different to the architectural value then the WRFFR operation performs a pipeline flush and a write operation at a step 1120. At a step 1130, FFR is updated to its new value.

Therefore, in examples, the control circuitry is configured, in response to execution of a program instruction to set the fault indication data to a value defined by that program instruction, to encode the fault indication data defined by that program instruction to register tag data associated with that program instruction (iii) ReadFFR (RDFFR)

As mentioned earlier, this operation decodes and reads the current value of FFR to a predicate register.

Referring to FIG. 12, at a step 1200 RDFFR read the speculative FFR value and at a step 1210, RDFFR is sent to the issue queues. At a step 1220 the RDFFR instruction is executed by the execution circuitry 150 and at a step 1230 RDFFR updates the relevant predicate register file.

In this example, therefore, the control circuitry 820, 830 is configured to selectively decode the fault indication data applicable to a newly committed program instruction and to write the decoded fault indication data to the fault indication register.

Circuitry Example with Reference to FIG. 1

Therefore, in the light of the discussion above, FIG. 1 provide an example of data processing circuitry 100 comprising:

out-of-order instruction execution circuitry 150 to execute program instructions, the program instructions having a program code order, the out-of-order instruction execution circuitry being configured to execute the program instructions in an instruction execution order which may differ from the program code order, the program instructions including vector processing instructions to perform vector processing operations to data vectors each comprising a plurality of elements having an element order; the out-of-order instruction execution circuitry being configured to execute program instructions defining a vector memory access operation in respect of the plurality of elements;

register mapping circuitry 130 to generate a register mapping for a program instruction to map zero or more architectural processor registers relating to execution of that program instruction to respective ones of a set of physical processor registers;

commit circuitry 160 to commit, in the program code order, the results of program instructions executed by the out-of-order instruction execution circuitry, the commit circuitry being configured to access a data store which stores register tag data to indicate which physical registers mapped by the register mapping circuitry relate to a given program instruction;

fault detection circuitry 152 to detect a memory access fault in respect of a vector memory access operation and to generate fault indication data indicative of an element earliest in the element order for which a memory access fault was detected;

a fault indication register 132 to store the fault indication data, in which the register mapping circuitry is configured to generate a register mapping for a program instruction for any architectural processor registers relating to execution of that program instruction other than the fault indication register; and control circuitry 800, 830 to encode the fault indication data, applicable to a program instruction not yet committed by the commit circuitry, to register tag data 810 associated with that program instruction.

Method Example

Figure 13:
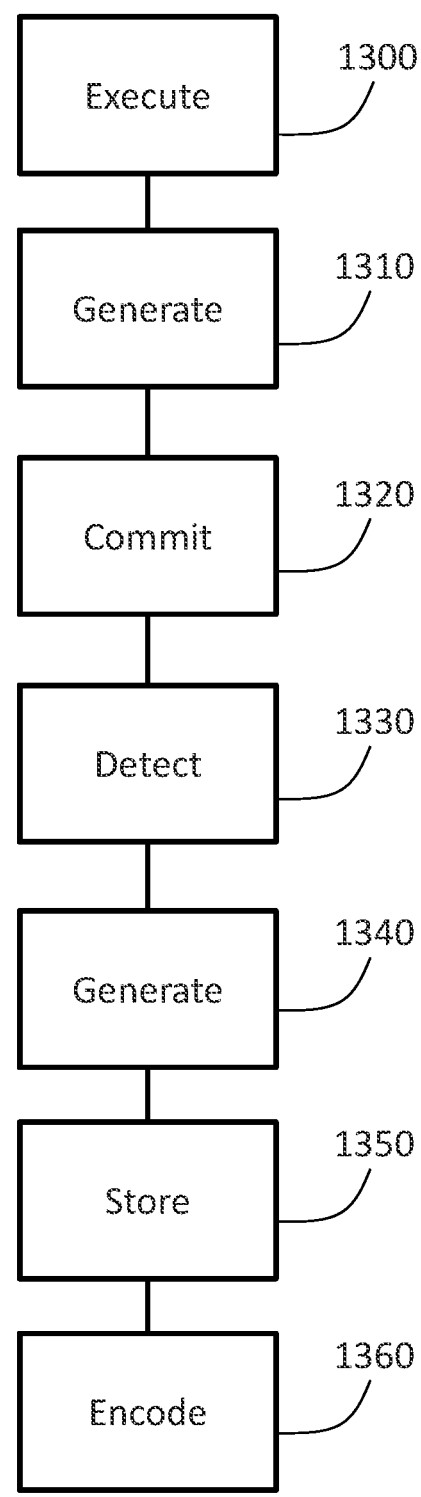

FIG. 13 is a schematic flow diagram illustrating a method comprising:

executing (at a step 1300) program instructions having a program code order, in an instruction execution order which may differ from the program code order, the program instructions including vector processing instructions to perform vector processing operations to data vectors each comprising a plurality of elements having an element order; the executing step comprising executing program instructions defining a vector memory access operation in respect of the plurality of elements;

generating (at a step 1310) a register mapping for a program instruction to map zero or more architectural processor registers relating to execution of that program instruction to respective ones of a set of physical processor registers;

committing (at a step 1320), in the program code order, the results of program instructions executed by the executing step, the committing step comprising accessing a data store which stores register tag data to indicate which mapped physical registers relate to a given program instruction;

detecting (at a step 1330) a memory access fault in respect of a vector memory access operation;

generating (at a step 1340) fault indication data indicative of an element earliest in the element order for which a memory access fault was detected;

storing (at a step 1350) the fault indication data in a fault indication register, in which the generating step is configured to generate a register mapping for a program instruction for any architectural processor registers relating to execution of that program instruction other than the fault indication register; and encoding (at a step 1360) the fault indication data, applicable to a program instruction not yet committed by the committing step, to register tag data associated with that program instruction.

Further Examples

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

The code may define different abstractions or representations of the concept, including RTL and SystemC/SystemVerilog/Arm Pseudocode representations.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bit stream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Data processing circuitry comprising:
out-of-order instruction execution circuitry configured to execute program instructions, the program instructions having a program code order, the out-of-order instruction execution circuitry being configured to execute the program instructions in an instruction execution order which may differ from the program code order, the program instructions including vector processing instructions to perform vector processing operations to data vectors each comprising a plurality of elements having an element order; the out-of-order instruction execution circuitry being configured to execute program instructions defining a vector memory access operation in respect of the plurality of elements;
register mapping circuitry configured to generate a register mapping for a particular program instruction to map zero or more architectural processor registers relating to execution of that particular program instruction to respective ones of a set of physical processor registers;
commit circuitry configured to commit, in the program code order, the results of program instructions executed by the out-of-order instruction execution circuitry, the commit circuitry being configured to access a data store which stores register tag data to indicate which physical registers mapped by the register mapping circuitry relate to a given program instruction;
fault detection circuitry configured to detect a memory access fault in respect of a vector memory access operation and to generate fault indication data indicative of an element earliest in the element order for which a memory access fault was detected;
a fault indication register configured to store the fault indication data, in which the register mapping circuitry is configured to generate a register mapping for the particular program instruction for any architectural processor registers relating to execution of that particular program instruction other than the fault indication register; and
control circuitry configured to encode the fault indication data indicative of the element earliest in the element order for which the memory access fault was detected, applicable to an uncommitted program instruction not yet committed by the commit circuitry, to register tag data indicating which physical registers mapped by the register mapping circuitry relate to that uncommitted program instruction.

2. The data processing circuitry of claim 1, in which the control circuitry is configured to selectively decode the fault indication data applicable to a newly committed program instruction and to write the decoded fault indication data to the fault indication register.

3. The data processing circuitry of claim 1, in which the control circuitry is configured to decode the fault indication data applicable to a newly committed program instruction when execution of the newly committed program instruction caused a program exception.

4. The data processing circuitry of claim 1, in which each data vector has a data vector length and in which the fault indication register has a size equal to or greater than the vector length.

5. The data processing circuitry of claim 4, in which the register tag data has a size which is smaller than the size of the fault indication physical register.

6. The data processing circuitry of claim 5, in which the register tag data has a size which is greater than or equal to the base-two logarithm of the size of the fault indication physical register.

7. The data processing circuitry of claim 1, in which the program instructions defining a vector memory access operation in respect of the plurality of elements define a set of memory access operations, one for each of the plurality of elements, at least some of the memory access operations for contiguous elements in the element order being accesses to non-contiguous memory locations.

8. The data processing circuitry of claim 1, in which the program instructions include a fault indication data setting program instruction to set the fault indication data to a value defined by that fault indication data setting program instruction.

9. The data processing circuitry of claim 8, in which the control circuitry is configured, in response to execution of the fault indication data setting program instruction, to encode the fault indication data defined by that fault indication data setting program instruction to register tag data associated with that fault indication data setting program instruction.

10. The data processing circuitry of claim 2, in which the program instructions include a fault indication data reading program instruction to read a current value of the fault indication data.

11. The data processing circuitry of claim 10, in which the control circuitry is configured, in response to execution of the fault indication data reading program instruction, to decode the fault indication data.

12. A method comprising:
- executing program instructions having a program code order, in an instruction execution order which may differ from the program code order, the program instructions including vector processing instructions to perform vector processing operations to data vectors each comprising a plurality of elements having an element order; the executing step comprising executing program instructions defining a vector memory access operation in respect of the plurality of elements;
- generating a register mapping for a particular program instruction to map zero or more architectural processor registers relating to execution of that particular program instruction to respective ones of a set of physical processor registers;
- committing, in the program code order, the results of program instructions executed by the executing step, the committing step comprising accessing a data store which stores register tag data to indicate which mapped physical registers relate to a given program instruction;
- detecting a memory access fault in respect of a vector memory access operation;
- generating fault indication data indicative of an element earliest in the element order for which a memory access fault was detected;
- storing the fault indication data in a fault indication register, in which the generating step is configured to generate a register mapping for the particular program instruction for any architectural processor registers relating to execution of that particular program instruction other than the fault indication register; and
- encoding the fault indication data indicative of the element earliest in the element order for which the memory access fault was detected, applicable to an uncommitted program instruction not yet committed by the committing step, to register tag data indicating which physical registers mapped by the register mapping circuitry relate to that uncommitted program instruction.

13. A non-transitory computer-readable medium to store computer-readable code for fabrication of a data processing circuitry comprising:
- out-of-order instruction execution circuitry to execute program instructions, the program instructions having a program code order, the out-of-order instruction execution circuitry being configured to execute the program instructions in an instruction execution order which may differ from the program code order, the program instructions including vector processing instructions to perform vector processing operations to data vectors each comprising a plurality of elements having an element order; the out-of-order instruction execution circuitry being configured to execute program instructions defining a vector memory access operation in respect of the plurality of elements;
- register mapping circuitry to generate a register mapping for a particular program instruction to map zero or more architectural processor registers relating to execution of that particular program instruction to respective ones of a set of physical processor registers;
- commit circuitry to commit, in the program code order, the results of program instructions executed by the out-of-order instruction execution circuitry, the commit circuitry being configured to access a data store which stores register tag data to indicate which physical registers mapped by the register mapping circuitry relate to a given program instruction;
- fault detection circuitry to detect a memory access fault in respect of a vector memory access operation and to generate fault indication data indicative of an element earliest in the element order for which a memory access fault was detected;
- a fault indication register to store the fault indication data, in which the register mapping circuitry is configured to generate a register mapping for the particular program instruction for any architectural processor registers relating to execution of that particular program instruction other than the fault indication register; and
- control circuitry to encode the fault indication data indicative of the element earliest in the element order for which the memory access fault was detected, applicable to an uncommitted program instruction not yet committed by the commit circuitry, to register tag data indicating which physical registers mapped by the register mapping circuitry relate to that uncommitted program instruction.

* * * * *